M. B. ERSKINE.
HOOKS FOR DRAW-RODS FOR HORSE-POWERS.
No. 186,236. Patented Jan. 16, 1877.
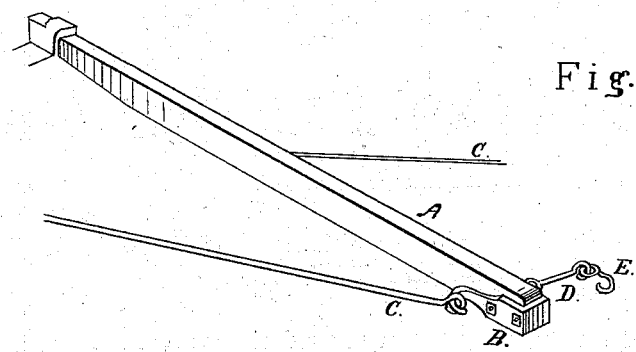
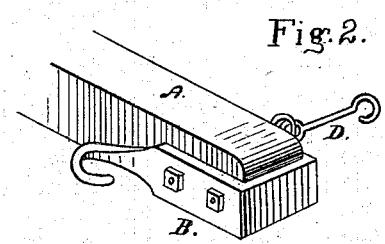
WITNESSES:
S. G. King
Chas. Freak
INVENTOR.
Massena B. Erskine
By J. B. Smith
his atty in fact

UNITED STATES PATENT OFFICE.

MASSENA B. ERSKINE, OF RACINE, WISCONSIN, ASSIGNOR TO J. I. CASE & CO., OF SAME PLACE.

IMPROVEMENT IN HOOKS FOR DRAW-RODS FOR HORSE-POWERS.

Specification forming part of Letters Patent No. 186,236, dated January 16, 1877; application filed June 24, 1876.

*To all whom it may concern:*

Be it known that I, MASSENA B. ERSKINE, of Racine, in the county of Racine, in the State of Wisconsin, have invented certain Improvements in Hooks for Draw-Rod for a Horse-Power, of which the following is a specification:

My invention has for its object the arranging of a hook on the outer end of a sweep of a horse-power, for the draw-rod to hook onto, a more particular description of which will be hereafter given.

Figure 1 is a view of a sweep and draw-bar with my invention attached, and Fig. 2 a view of a section of same.

A is the sweep of a horse-power; B, the hook and clasp around the end of the sweep; C, the draw-rod, hooking into the hook B; D, an eyebolt through the end of the sweep and clasp; E, a rod and hook attached to the eyebolt D, by which the horses draw and propel the horse-power.

This hook B is new, for the reason that it is attached to a clasp over the end of the sweep, and holds the draw-rod firmly, and the bolt, passing through the clasp and sweep, holds them firmly together.

I claim as new and as my invention—

Hook and clasp B, in combination with sweep A and rod C, substantially as described.

MASSENA B. ERSKINE.

Witnesses:
JOHN TAPLEY,
C. H. MINER.